United States Patent
Beroza et al.

(10) Patent No.: US 7,020,996 B2
(45) Date of Patent: *Apr. 4, 2006

(54) METHOD AND SYSTEM FOR REMOTELY DETECTING TRAPPED INSECTS

(75) Inventors: Morton Beroza, 821 Malta La., Silver Spring, MD (US) 20901; Roman Machan, Severna Park, MD (US)

(73) Assignee: Morton Beroza, Silver Spring, MD (US)

(*) Notice: Subject to any disclaimer, the term of this patent is extended or adjusted under 35 U.S.C. 154(b) by 13 days.

This patent is subject to a terminal disclaimer.

(21) Appl. No.: 10/627,654

(22) Filed: Jul. 28, 2003

(65) Prior Publication Data

US 2004/0093190 A1    May 13, 2004

Related U.S. Application Data

(63) Continuation-in-part of application No. 10/097,629, filed on Mar. 15, 2002, now abandoned.

(60) Provisional application No. 60/281,725, filed on Apr. 6, 2001.

(51) Int. Cl.
*A01M 1/00* (2006.01)

(52) U.S. Cl. .................. 43/124; 43/132.1; 340/573

(58) Field of Classification Search ............. 43/124, 43/132.1; 340/573
See application file for complete search history.

(56) References Cited

U.S. PATENT DOCUMENTS 5,396,729 A * 3/1995 Vejvoda .................. 43/114
5,592,774 A    1/1997 Galyon
5,877,422 A * 3/1999 Otomo .................. 73/587
6,052,066 A * 4/2000 Su ..................... 340/870.16
6,255,959 B1   7/2001 Lake et al.

OTHER PUBLICATIONS

M. Beroza, "Insect Attractants are Taking Hold," Agr. Chem., vol. 15, pp. 37-40, 1960.
M. Beroza, et al., "New Attractants for the Mediterranean Fruit Fly," J. Agr. Food Chem., vol. 9, No. 5, pp. 361-365, 1961.

(Continued)

*Primary Examiner*—Kurt Rowan
(74) *Attorney, Agent, or Firm*—Rosenberg, Klein & Lee

(57) ABSTRACT

Detection and monitoring of flying insects of a given species can be facilitated by placing inside a lure-baited trap a microcontroller assembly that can sense and discriminate the presence of that species, usually by the sound it makes and then sending a positive report to a central monitoring station by satellite, internet, or antennae transmission. The central monitoring station receives the putative identifications of the targeted insect species, matched with the locations of traps responding positively, and then maps the locations of the positive trap responses. Additional features include: identification of insect species by a characteristic acoustic frequency range, a pattern stored in the microcontroller and/or the central monitoring station; use of multi-lure traps; periodic transfer of test signals from the central monitoring station to remote detection stations to verify that the system is working properly; and use of the microcontroller sensor assembly without traps to monitor sound-emitting life forms at sites attractive to targeted species.

17 Claims, 3 Drawing Sheets

Typical Steiner Trap, containing insecticide or adhesive material to retain insects, modified to include a microcontroller detection and reporting assembly.

OTHER PUBLICATIONS

M.N. Inscoe, M. Beroza, "Insect-Behavior Chemicals Active in Field Trials," ACS Symposium Series, No. 23, pp. 145-181, 1976.

J.C. Webb, et al., "Acoustical Aspects of Behavior of Mediterranean Fruit Fly, *Ceratitus capitata*," Ent. Exp. Appl. 1, pp. 1-8, 1983.

J. McBride, M. Wood, "A Better Bait for Medfly," Agric. Research Magazine, Oct. 2000.

A.R. Hill, "Choice of Insecticides in Steiner Trap Affects Capture Rate of Fruit Flies," J. Econ. Ent., vol. 79, No. 2, pp. 533-536, 1986.

* cited by examiner

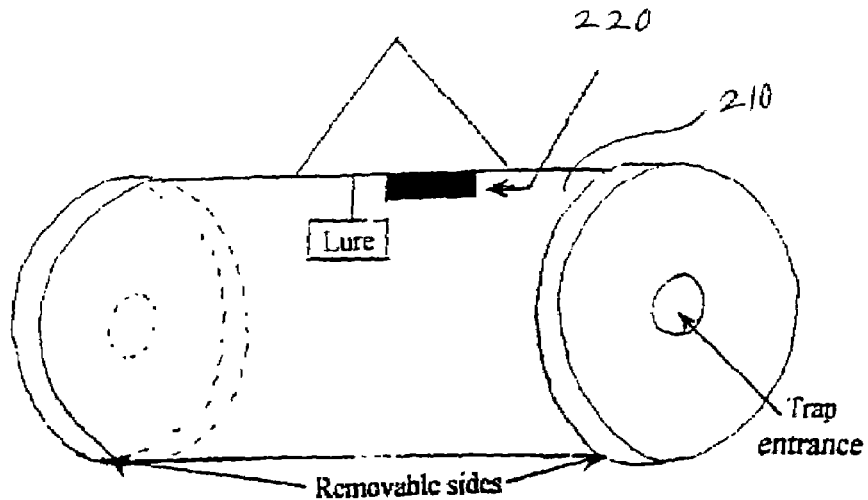
Figure 1: Typical Steiner Trap, containing insecticide or adhesive material to retain insects, modified to include a microcontroller detection and reporting assembly.
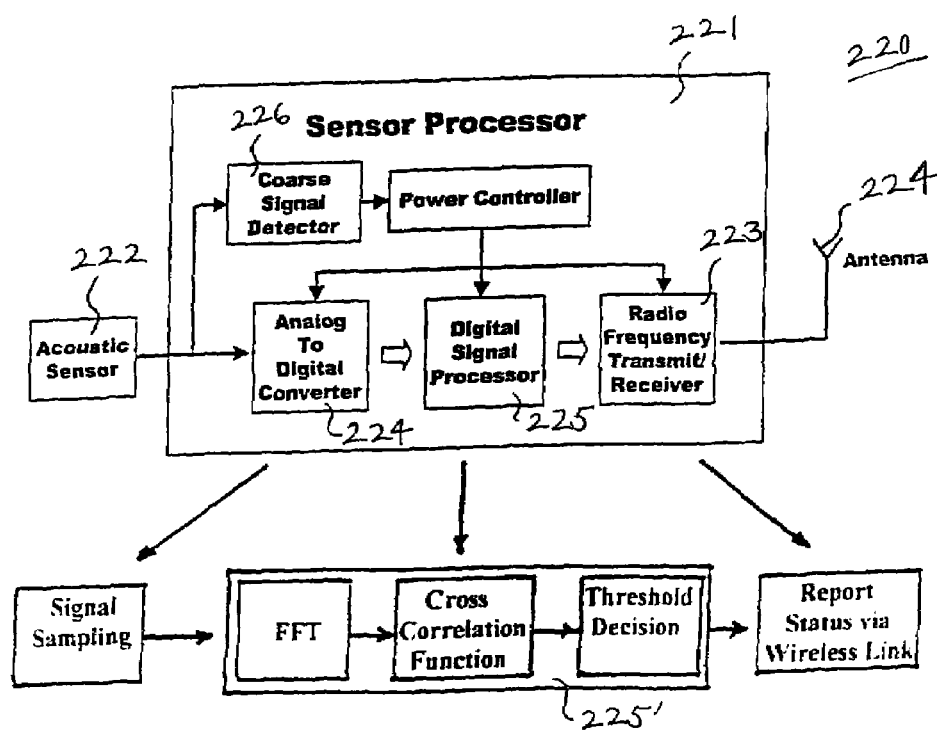
Figure 2: Detection System

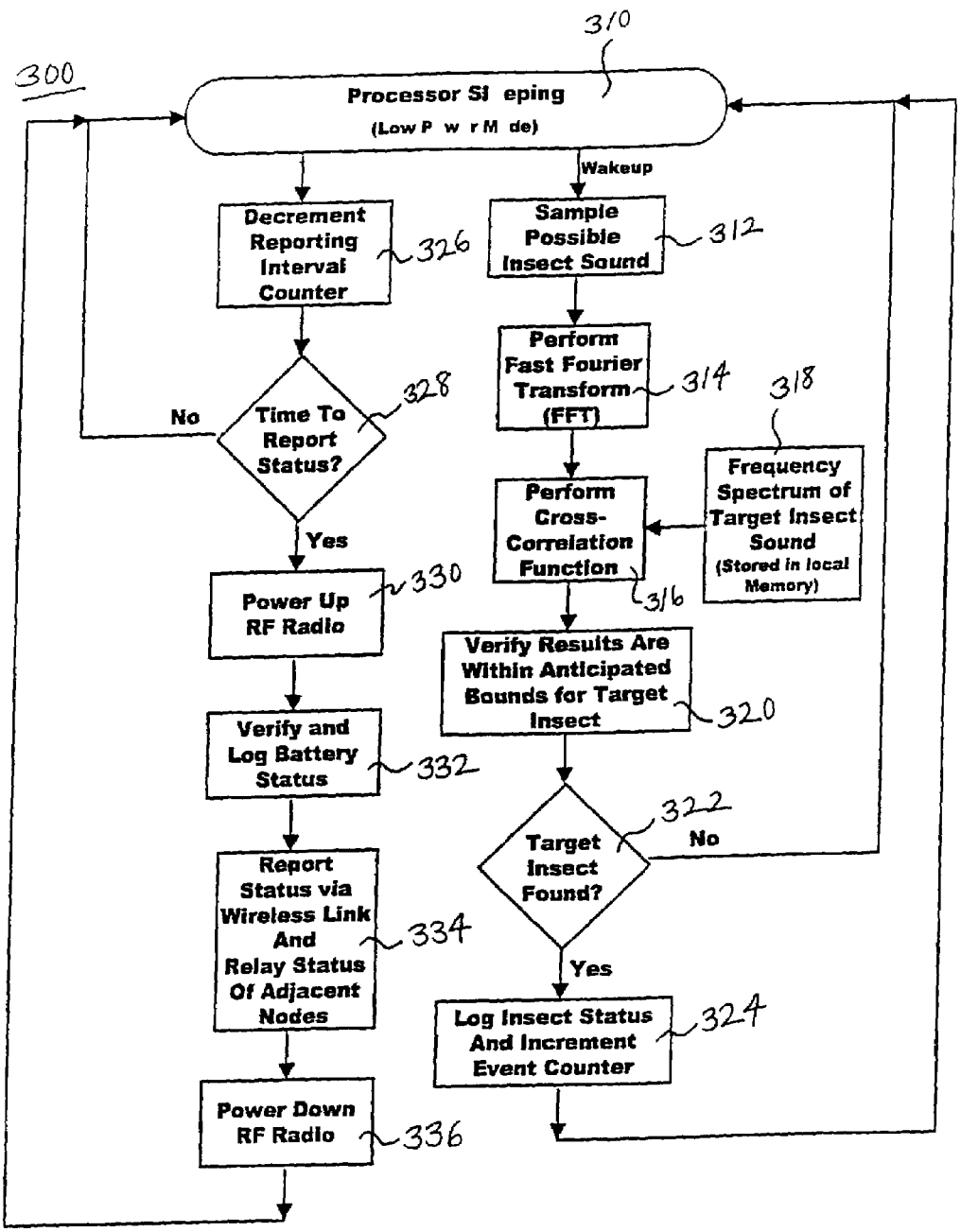
Figure 3: Microcontroller Flowchart

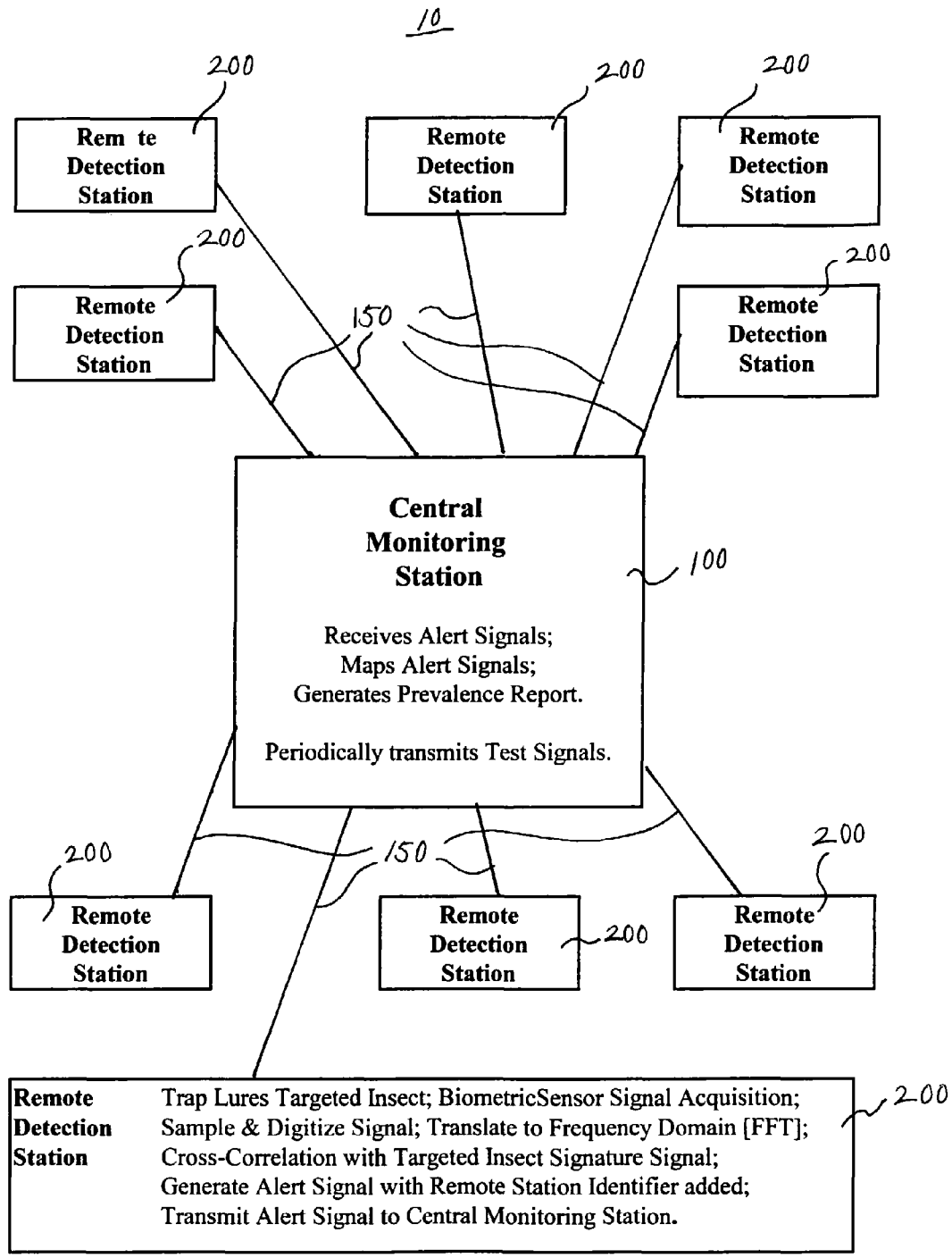
Figure 4: Block Diagram of Method of Automatic Direct Detection and Central Monitoring of Targeted Insects

METHOD AND SYSTEM FOR REMOTELY DETECTING TRAPPED INSECTS

CROSS-REFERENCE TO RELATED APPLICATIONS

This Patent Application is a Continuation-in-Part to U.S. patent application Ser. No. 10/097,629 filed 15 Mar. 2002 now abandoned, based on Provisional Patent Application 60/281,725 filed 6 Apr. 2001.

GOVERNMENT LICENSE RIGHTS

The U.S. Government has a paid-up license in this invention and the right in limited circumstances to require the owner to license others on reasonable terms as provided for by the terms of a research and development contract granted by the U.S. Department of Agriculture.

BACKGROUND OF THE INVENTION

Preventing the introduction into this country of insect pests that could potentially wreak havoc on the food supply is essential not only to the population's general well-being, but to the soundness of the agricultural economy. For example, were such species as the Mediterranean fruit fly (medfly) allowed to flourish in this country, citrus and other crops in California, Texas, Florida, and other subtropical areas would be devastated, and losses could total in the billions of dollars.

Typically, traps containing lures, pheromones (sex attractants), and the like are suspended from trees, foliage, and other naturally occurring platforms in an effort to attract and thereby detect insect pests, usually flying ones. Such traps are spread over many miles of territory to capture and thereby monitor the presence and any migratory patterns of the targeted insect species. The information derived is used to determine where and when control measures—such as insecticide applications, sterile-insect releases, pheromones releases (confusion techniques)—are to be taken.

This operation makes for a very efficient means of controlling or eradicating the targeted species from areas (especially large ones), and therefore is highly desirable from an agricultural and ecological standpoint. If pesticide is to be used, the procedure allows it to be applied selectively, only where needed—and only as long as needed—to effect control or eradication of the targeted species. Thus, contamination of the environment is minimized and cost savings may be realized from the judicious use of insecticide permitted.

Ultimately, though, the effectiveness and in many cases, the practicability of such approach hinges upon the rapid detection of the targeted insect or similar pest at numerous distributed monitoring sites. Only then, can incipient infestations, for instance, be treated with insecticide or other control measures quickly to eliminate the pests before they can spread. For example, to prevent the medfly from entering California, a great amount of time and money is currently being spent by the U.S. Department of Agriculture (USDA) to monitor this insect pest with lure-baited traps. Workers must travel to and personally examine biweekly each of the approximately 150,000 lure-baited traps that are distributed over the State, each at a distance of a mile or more from another. Such efforts have continued to prevent the medfly from pervading this country since the species was eradicated from Florida in the late 1950s. There remains a need, therefore, for a method and system whereby fast, efficient, and accurate monitoring of numerous distributed sites may be effected within reasonable cost constraints.

SUMMARY OF THE INVENTION

This invention relates to a more efficient means of detecting and monitoring the presence of harmful insects or other species, especially flying ones, that respond to lure-baited traps.

It is a primary object of the present invention to provide a method and system for remotely and accurately detecting the presence at one or more remote sites of a predetermined insect species.

It is another object of the present invention to provide a method and system for so detecting the presence of the predetermined insect species at one or more of the remote sites in an automated manner.

These and other objects are attained in accordance with the present invention by the subject method and system wherein a central monitoring station and a plurality of remote detection stations located remotely therefrom are established. Each of the remote detection stations operates to acquire a sensed biometric signal of a candidate member of a pre-selected, or targeted, insect species. The sensed biometric signal is analyzed for a candidate biometric signature correlation with pre-stored characteristic biometric information for the targeted insect species. A positive alert signal is then generated and transmitted from each remote detection station responsive to a correlation of the sensed biometric signal with the characteristic biometric information. This positive alert signal is then received at the central monitoring station, where it is processed accordingly.

In one preferred embodiment, the whereabouts of the targeted insect species is monitored over a wide geographic area using a programmable microcontroller (or related device) with each of the lure-baited traps at remote detection stations within the area. At each remote detection station, the programmable microcontroller operates to report the presence of the targeted insect species that enter the trap to a computer at the central monitoring station. The stimulus to which the microcontroller will respond is pre-determined for each species. A candidate stimulus may be a distinctive sound or sounds in a particular wavelength range, or an odor or chemical emitted by the insect that enters the trap, for instance. Even the flapping of the wings of a responding insect species, may be an adequate signal for some species. The combination of a lure plus a microcontroller-based device that automatically detects, discriminates and reports the distinctive sound or other biometric discriminant characteristic of the targeted insect species, upon their entry into any of the widely dispersed remote traps to a central monitor station preferably, though not necessarily, occurs via a wireless communications link.

BRIEF DESCRIPTION OF THE DRAWINGS

FIG. 1 is a schematic diagram of one embodiment of a trap employed at a remote detection station in accordance with the present invention;

FIG. 2 is a flowchart illustrating a detection process carried out at a remote detection station in one embodiment of the present invention;

FIG. 3 is a flowchart of operations carried out within a programmable microcontroller employed at a remote detection station for automated insect detection and reporting in one embodiment of the present invention; and, FIG. 4 is a schematic diagram illustrating a distributed monitoring system in one embodiment of the present invention.

DETAILED DESCRIPTION OF THE PREFERRED EMBODIMENTS

Referring first to FIG. 4, there is schematically illustrated a system 10 for remotely monitoring the presence of one or more species of targeted insects at a plurality of remotely distributed detection stations. The system generally includes a central monitoring station 100 and a plurality of remote detection stations 200 operably linked thereto via a suitable communications link 150. Depending on the requirements of the given application, the communications link 150 may be established and maintained either continually or on a non-continual, as-needed basis. Preferably, communications link 150 is a wireless link of any suitable type known and readily available in the art, over which bidirectional communication between central monitoring station 100 and each remote detecting station 200 may occur at appropriate times.

Central monitoring station 100 preferably includes suitable computer-based equipment for automated monitoring operation. Preferably, central monitoring station 100 is programmably configured to reliably and accurately receive from one or more remote detection station 200 various alert and/or reporting information for storage and appropriate application-specific processing. Central monitoring station 100 thus operates to compile and map the alerting/reporting information received from the distributed remote detection stations 200, and to generate prevalence or other reports indicative of the targeted species' dwelling and migration patterns, for example. In a preferred embodiment, central monitoring station 100 periodically transmits test signals to the distributed remote detection stations 200 to verify their operational condition, thereby maintaining an ongoing check of system integrity.

Each remote detection station 200 is established at a suitable location remotely disposed from central monitoring station 100 for the detection and accurate discrimination of the targeted insect species physically present at that location. As described in following paragraphs, each remote detection station 200 preferably includes a trapping device equipped with one or more suitable lures for the one or more insect species targeted. Each remote detection station 200 also includes one or more units for sensing and acquiring certain biometric information upon the entry of an insect into the trapping device. Such units preferably include a programmably configured device which operates to carry out biometric signature recognition processing upon a signal bearing the acquired biometric information. Preferably, such processing is carried out with reference to pre-stored characteristic biometric information for each targeted species. Responsive to a positive correlation of the sensed biometric information signal with the characteristic biometric information, a positive alert signal is generated by the given remote detection station 200 for transmission to central monitoring station 100.

Preferably, each remote detection station 200 is assigned a unique station identifier. This identifier is preferably included in the transmission of alert and other reporting signals, so as to unambiguously identify for central monitoring station 100 the source of such signals.

Preferably, each remote detection station 200 employs one or more microcontroller devices to programmably implement the required signal processing and control threat. Any suitable microcontroller device hardware known in the art may be employed, subject of course to its ability to meet the particular environmental and operational requirements of the intended application. As described later in following paragraphs, the microcontroller device is programmably configured preferably to execute such sequence of operations as shown in FIG. 3.

That insects make highly specific sounds that are characteristic of their species has been known for some time. Iowa State University has even compiled a library of the unique sounds made by different insect species. Among the many species for which such characteristic sounds have been recorded are the medfly or Mediterranean fruit fly (*Ceratitus capitata*), the Carribean fruit fly (*Anastrepha suspensa*), and the salt marsh mosquito (*Aedes taeniorynchus*).

For the accurate electronic transmission and/or reception of the sounds via the proposed wireless microcontroller arrangement, sounds are digitized in so far as analog sound transmissions, especially if weak, are apt to be unreliable.

Because the computer-based central monitoring station 100 monitoring the microcontrollers in the remote stations' traps receive reports of positive trap captures almost as soon as they occur—and certainly far quicker than by the current manual inspection of each trap every few weeks—incipient infestations may be treated quickly and thereby eliminated before they can spread. The subject method and system are also applicable to the monitoring of insect populations over large farming acreages to similarly eliminate incipient infestations before they can spread.

Such use of the microcontroller in lure-baited traps to remotely signal the presence of the targeted insect to central monitoring station 100 is likely to be extensive. As noted, the medfly is presently kept from pervading California by about 150,000 lure-baited traps that are manually inspected every few weeks. Many more such traps that must similarly be manually inspected are deployed in Florida, Texas, and Mexico, to keep the insect out of the U.S. With the medfly present in Europe, Africa, Australia, Central and South America, and Pacific areas, lure-baited traps are also being used to detect and thereby help combat the medfly in those areas. FIG. 1 shows a Steiner-type trap 210, which is used in the monitoring of the medfly as well as other fruit flies and flying insects, modified to incorporate the automated sensor and discriminator device 220 of the present invention.

Many other insect species are now being monitored by pheremones- or lure-baited traps to effect their control or eradication. For example, 400,000 gypsy moth traps are dispersed each year over large areas of the eastern U.S. The remote-detection procedure being advanced would be applicable to many of these other species as well. Furthermore, with today's computers, monitoring large numbers of traps with the appropriate software can be made fairly routine, and thus the very costly procedure of checking each trap manually at frequent intervals, such as biweekly, would be avoidable through the use of this invention.

Transmitting the desired information from the traps can be carried out inexpensively—by a satellite (internet or government), antennae, or perhaps by a telephone company. Preferably, a battery- or solar-powered microcontroller transmits its signals, preferably in digitized form, to a distant central monitoring station that is set up to monitor the trap's responses. The insect detection and identification/discrimination processing in accordance with the present invention is preferably carried out at the remote nodes. While acquired sound or other acquired biometric data may be passed from the remote nodes to the central monitoring station (for central processing there) where the requirements and available resources of the intended application so permit; the distributed approach of processing locally at the remote nodes will likely be more practicable, hence preferable, in many applications. Such distributed processing typically minimizes the data transmission load and therefore reduces the requisite cost and complexity of the resulting system, among other things.

Location of the trap can be designated by latitude-longitude or by trap number, which number can precede or follow each transmitted message. The overall process of one embodiment may be viewed in the broadest aspect as the forwarding of processed information based on or including insect sounds (or other acquired biometric data) to the central monitoring station from remote detection stations if and when the targeted insects enter the traps. Preferably, at least some degree of discrimination processing is carried out locally at each remote station 200, so as to minimize the spurious detections—of non-targeted species, for instance— to central station 100.

While trap sounds and/or other biometric information and reports may be transmitted as soon as detected, such data is preferably collected and stored in the trap microcontroller for subsequent transmission at a scheduled periodic time (e.g., once or twice a day) to central monitoring station 100. The central monitoring station compiles the received data for each species reported and designates or maps the locations of the positive trap responses, thereby generating a prevalence report for the targeted insect species in the area under surveillance. A plurality of nodes are preferably established at distance intervals suitable for the given application so as to establish a network as expansive as necessary by which to relay remote trap responses to the central monitoring station.

As illustrated in FIGS. 2 and 3, the programmable microcontroller sensor 220 is used preferably in a wireless network of remote detection stations 200 or sensor nodes to automatically detect the presence of targeted insect sounds. These nodes operate to sense the targeted insect acoustic signatures and periodically relay the resulting information to central monitoring station 100 for display and appropriate evaluation. Each network node contains at least one sensor processor 221, at least one acoustic sensor 222, a digital signal processor 225, a radio frequency transceiver 223, an antenna 224, and a power source such as a battery. The nodes collect acoustic data, locally process the data, and communicate certain status results with neighboring nodes.

The analog acoustic data of sensed candidate insect sounds transduced by the acoustic sensor 222 is sampled in an analog-to-digital converter 224 and passed to a digital signal processor 225. Here the data is translated from the time domain to the frequency domain using, for example, a Fast Fourier Transform (FFT) or other suitable technique known in the art, as shown in discrimination processing block 225. A cross-correlation function is thereafter performed to compare the transformed sampled sounds with digitally stored characteristic insect sound information. The use of cross-correlation provides recognition of targeted insect sounds in the presence of background noise, including sounds from other non-targeted insects. A threshold decision is then carried out on the output of the cross-correlation function and, cross-correlation coefficients that exceed predetermined thresholds will prompt the sensor node to report desired events with sufficient levels of confidence. Confidence levels, hence reporting accuracies, will be high, given a sufficient number of sample comparisons and appropriately tuned thresholds. Status results are temporarily stored in memory until the next scheduled reporting opportunity. The flow chart of the control and processing steps 300 automatically effected at each remote detection station 200 is illustrated in further detail in FIG. 3.

As indicated at 310, the radio-frequency transceivers at remote detection stations 200, or sensor nodes, are typically in a powered down state while awaiting the next reporting epoch. Periodically, at each reporting epoch, every node within the network will power up its radio frequency transceiver 223 to report its own status if necessary (to save power, status reports occur only when there is something of interest to report) or to simply serve as a relay node by passing along the status results of other nodes. To further reduce power and extend battery life, a coarse signal detector 226 is used prompt the power controller 227 to "wake up" the analog-to-digital converter 224 and the digital signal processor 225 in response to the appearance of any significant energy levels within the expected region of the frequency spectrum. The coarse signal detector 226 allows the digital signal processor 225 and the analog-to-digital converter 224 to transition to a low minimal power state between sampling epochs.

After sampling the candidate signal of interest at flow block 312, the digital signal processor 225 uses at 314 a Fast Fourier Transform to translate the signal from the time-domain to the frequency-domain. Next, the digital signal processor 225 performs at 316 a cross-correlation function between the new sensed sample signal and a stored version of the frequency spectrum of the given biometric characteristic data for the targeted insect (block 318). The results of the cross-correlation function are then evaluated in light of predetermined correlation criteria at 320 to determine whether or not a target insect has been found (block 322). If so, an insect status log is updated, and an event counter is incremented at 324 before control is again passed to flow block 310.

In the case of the Mediterranean fruit fly, the unique wingbeat frequency as the insect approaches a lure-baited trap generates the sound of interest. The signature of the Mediterranean fruit fly in terms of this biometric parameter falls within a narrow window of correlation values that distinguishes it from other fruit flies and other insect species. In a preferred embodiment, each of the remote detection stations 200 incorporates the programmable microcontroller which acquires sensed insect acoustic signals from a candidate insect, converts those sensed signals to digital form, translates the digitized candidate insect sound to a frequency domain format, cross-correlates it with the characteristic biometric signature signal of the targeted insect, and transmits a positive alert signal to the central monitoring station responsive to a positive correlation, preferable by a wireless network.

Referring back to FIG. 3, a reporting integral counter is decremented at 326 between reporting events. A check is made at block 328 as to whether or not a scheduled report time has arrived. If not, control is returned to flow block 310. If such report time has arrived, the RF transceiver 223 is powered up (block 330), and battery status is verified and logged at 332. The current status of the given remote detection station 200, as well as any status of neighboring stations/nodes, is reported at 334 to control central monitoring station 100 via the wireless link. The RF transceiver 223 is again powered down thereafter (at 336), and control is returned again to block 310.

In an alternative embodiment, the microcontroller causes candidate insect sounds from the trap to be transmitted to the central monitoring station. In such embodiment, the microcontroller is configured to accept only sounds of the targeted species, generally by suitable filtering techniques like restricting acoustic reception to the appropriate wavelength range (mH) and sound pattern. This minimizes the load of data needing to actually be transmitted.

An important feature of this invention is the ability to determine whether the trap microcontroller parts are working properly. Toward this end, defects in remote surveillance are detected by periodically sending a test signal (generally, the acoustic signature of the targeted insect) from the central monitoring station to all traps at the remote monitoring stations, to determine whether the trap components are responding properly; traps not responding positively to the test signature signal then can have their equipment replaced or repaired. Such polling test signals can be sent at times when the insect normally would not respond to the trap lure, for example, during the middle of the night.

The particular trap design used in insect trapping will vary according to the species and the trapping means used (for example, insecticide, adhesive matter inside the trap, etc.). The Steiner-type trap, seen modified in FIG. 1, has been widely used for capturing and detecting fruit flies. It may be desirable to have the trap sound-insulated or to configure the microcontroller or other sensor components to exclude extraneous sounds. Sounds made within the trap by entering insects will tend to be clearer when background sounds from outside the trap are minimized.

Other means of saving time and money may involve the placement of lures for two or more insect species into one trap if it is determined that such an arrangement will attract and capture both species without interfering significantly with the trapping ability of either species, provided that the entry sounds (or other biometric parameters employed) of the insects can be distinguished from each other. A microcontroller element for each species may be placed in the trap, or a single programmable microcontroller element that responds to both species may be used. A trap capable of attracting more than two species should not be ruled out, because many currently used traps are deployed solely to detect accidental introduction of foreign insect species into areas essentially free of those given species.

In general, the embodiment of the method described herein will facilitate efficient detection of insects of a given targeted species over large areas by placing preferably inside lure-baited traps a microcontroller assembly that both directly detects and discriminates the presence of the targeted species by matching the insect sound sensed upon trap entry with a stored uniquely identifying acoustic signature for the targeted insect species. A digitized signal is transmitted then to a central monitoring station; that transmission incorporates either the sensed insect sound signal or a report of a positive correlation indicating the presence in the trap of a member of the targeted insect species. The location of each trap is an important part of each signal transmission from the remote detection stations to the central monitoring station so as to enable the mapping of trap locations responding positively. The resulting maps of positive targeted insect identifications by the remote detection stations constitute the prevalence of the targeted insect species for analysis and reporting purposes. In addition, it is important for the system to periodically, for example once or twice a day, send a test positive-entry signal to each trap to determine from the trap response whether each remote detection station is working properly.

Other applications and considerations relevant to the present invention include the use of the direct detection and wireless reporting system to detect specific sounds of any life form, and even in some cases without the use of traps. Thus, the microcontroller sensor elements can be located at great distances apart, at or near plants, trees, or locations that attract insects or animals that emit specific sounds; sounds of the targeted species received at the remote detection stations can then reveal the locations of the targeted species. Traps employed in accordance with this invention may be used to track beneficial species as well as harmful ones. Another possibility would be to establish a central monitoring station associated with each telephone area code, if sound transmission is thereby made clearer and/or more reliable.

With the need to inspect traps only every few months, lures lasting much longer than those in current use would be needed in the foregoing applications. A device that extends the duration of lure attractants, such as the medfly attractant Trimedlure, to several months is referenced in U.S. patent application Ser. No. 10/247,739.

In summary, the present invention is generally directed to an automated method of centrally monitoring the remote direct sensing of pre-selected targeted insects. This automated method involves establishing a central monitoring station and a number of remotely located detection stations. The remote detection stations receive biometric signals of a candidate targeted insect; the biometric signal may be an acoustic signal, a chemical signal, or some other unique and directly measurable biometric variable. Once the biometric signal has been received at the remote detection station, the signal is analyzed using a biometric signature recognition system which has stored within it a characteristic biometric signal information of the targeted insect species. The automated method further involves transmitting to a central monitoring station a positive alert signal of a candidate member of said targeted insect species, which preferably includes a unique station identifier. The central monitoring station receives the positive alert signals from the remote detection stations and analyzes the data received to determine the prevalence of said targeted insect species.

The automated insect monitoring system includes the central monitoring station and remote detection stations as described above. The remote detection stations include insect traps with a lure for attracting a targeted insect species. A programmable microcontroller is incorporated preferably into each of the remote detection stations and is adapted to include a biometric sensor, a coarse signal detector that receives signal communications from the biometric sensor and then sends those coarse signals to an analog-to-digital converter. A digital signal processor is likewise incorporated into the microcontroller functionality and takes the digitized candidate insect sound, that is, the output from the analog-to-digital convertor, and translates it from a time-domain to a frequency-domain format so that it can be then cross-correlated with the catalogued biometric signature of the targeted insect species. The cross-correlation will be deemed positive, that is, there will be a recognition of the targeted insect species having entered the particular trap, if and when a predetermined threshold of cross-correlation is reached. The positive signal is then conveyed to the radio-frequency transceiver and a positive alert message or signal is communicated to the central monitoring station, by wireless transmission or by adapting to a nodal transmission system.

In other words, the present invention is directed in one aspect of the invention to an automated method for remotely monitoring the prevalence of targeted insects by directly detecting and signaling the presence of a targeted pre-selected insect species. A central monitoring station and a number of remotely located detection stations are set up, with each of said remote detection stations including both a trap having a lure for attracting a targeted insect species, and an alerting unit. A pre-stored value for a characteristic biometric signal that uniquely identifies the targeted insect species is provided to either the central monitoring or the remote detection stations, or both.

The remote detection stations are equipped with a microcontroller system for automatically detecting and discriminating the presence in a trap of a member of said targeted species, by directly sensing the biometric signal characteristics, and comparing a directly sensed value with the pre-stored value of the identifying biometric characteristic. The positive comparison of sensed and stored biometric signal characteristics leads to the alerting unit generating a positive alert signal; transmitting from the remote detection station to the central monitoring station a positive alert signal that may include a unique remote station identifier. The central monitoring station receives the positive alert signals from one or more of the remote detection stations and determines the prevalence of the targeted insect species.

Although this invention has been described in connection with specific forms and embodiments thereof, it will be appreciated that various modifications other than those discussed above may be resorted to without departing from the spirit or scope of the invention. For example, equivalent elements may be substituted for those specifically shown and described, certain features may be used independently of other features, and in certain cases particular locations of elements may be reversed or interposed, all without departing from the spirit or scope of the invention as defined in the appended claims.

What is claimed is:

1. An automated method for monitoring the sensing of pre-selected targeted insects at a remote location, comprising:
    (a) establishing a central monitoring station and at least one remote detection station located remotely therefrom;
    (b) sampling at said remote detection station a sensed biometric signature of a candidate targeted insect;
    (c) analyzing in situ said sensed biometric signature of said candidate targeted insect using a processor-based biometric signature recognition system, wherein said biometric signature recognition system has electronically stored therein a characteristic biometric signature of said targeted insect species for automatic comparative verification relative thereto, identification of the candidate is made with respect to the targeted insect species;
    (d) transmitting from said remote station a positive alert signal of a candidate member of said targeted insect species responsive to said step of analyzing said biometric signal of a candidate targeted insect;
    (e) receiving said positive alert signal at said central monitoring station; and,
    (f) determining at said central monitoring station a prevalence of said targeted insect species.

2. The automated method for monitoring the sensing of pre-selected targeted insects as recited in claim 1, wherein said biometric signal is an acoustic signal, said characteristic biometric signal information is an acoustic signal information specific for a targeted insect species or an acoustic signature of a targeted insect species, and said biometric signature recognition system is an acoustic signature recognition system.

3. The automated method for monitoring the sensing of pre-selected targeted insects as recited in claim 1, wherein said biometric signature recognition system includes a coarse signal detector, a power control device, an analog-to-digital signal convertor, and a digital signal processor.

4. The automated method for monitoring the sensing of pre-selected targeted insects as recited in claim 1, further comprising the step of periodically polling said remote direct sensing station from said central monitoring station for checking the operational integrity thereof.

5. The automated method for monitoring the direct sensing of pre-selected targeted insects as recited in claim 1, wherein said positive alert signal includes a unique remote detection station identifier.

6. The automated method for monitoring the direct sensing of pre-selected targeted insects as recited in claim 1, wherein said step of analyzing said sensed biometric signal further includes a step of executing a sequence of processing steps stored in a computer readable medium.

7. An automated insect monitoring system comprising:
    (a) a central monitoring station and at least one remote detection station located remotely therefrom, wherein said remote detection station includes an insect trap that includes a hire for attracting a targeted insect species;
    (b) a biometric sensor in communication with said remote detection station operable to sample a sensed biometric signature of a candidate insect;
    (c) a coarse signal detector receiving signal communications from said biometric sensor wherein said biometric sensor conveys to said coarse signal detector the sensed biometric signature in analog form;
    (d) an analog-to-digital converter receptively connected to said biometric sensor;
    (e) a digital signal processor connected electronically to said analog-to-digital converter, wherein said digital signal processor has stored therein a biometric electronic signature or characteristic biometric signal information specific to a targeted insect species for in situ comparative verification of said sensed biometric signature relative thereto, whereby identification of the candidate is made with respect to the taracted insect species;
    (f) a radio-frequency transceiver connected electronically to said digital signal processor;
    (g) a power controller receptively connected electronically to said coarse signal detector and connected electronically in a reversibly actuating manner to said analog-to-digital converter and to said digital signal processor and to said radio-frequency transceiver, wherein said power controller has a first stable low-power configuration and a second stable high-power configuration; and,
    (h) an antenna connected electronically to said radio-frequency transceiver and in bidirectional electronic communication with said central monitoring station.

8. The automated insect monitoring system as recited in claim 7, wherein said sensed biometric signal is a sensed acoustic signal, and said biometric electronic signature or characteristic biometric signal specific for a targeted insect species is an acoustic electronic signature or a characteristic acoustic signal information specific for a targeted insect species.

9. The automated insect monitoring system as recited in claim 7, including a computer readable medium that stores an executable sequence of processing steps, which is included in said digital signal processor.

10. The automated insect monitoring system as recited in claim 7, wherein said digital signal processor is operable to automatically generate a cross-correlation measure of said sensed biometric signal and said characteristic biometric signal information for comparison with a threshold parameter.

11. An automated method for remotely monitoring the prevalence of targeted insects by directly detecting and signaling the presence of targeted pre-selected insects, comprising the steps of:
(a) establishing a central monitoring station and at least one remote detection station located remotely therefrom;
(b) establishing at said remote detection station a trap having a lure for attracting a targeted insect species and a processor-based alerting unit;
(c) providing at least one of said central monitoring station and said remote detection station with a pre-stored value for a characteristic biometric signal information uniquely identifying said targeted insect species;
(d) automatically detecting and verifying at said remote detection station the presence in said trap of a member of said targeted insect species, including the step of directly sensing said biometric characteristic by sampling a biometric signature of a trapped insect, and further including the steps of comparing in situ a directly sensed biometric signature sample to said pre-stored value of said characteristic biometric signal information for comparative verification responsive thereto, identification of a trapped insect is made with respect to the targeted insect species, and generating at said alerting unit a positive alert signal responsive to said step of comparing a directly sensed value and said pre-stored value of said biometric characteristic;
(e) transmitting said positive alert signal to said central monitoring station from said remote detection station; and,
(f) receiving at said central monitoring station said positive alert signal from said remote detection station and determining the prevalence of said targeted insect species.

12. The automated method for remotely monitoring the prevalence of targeted insects by directly detecting and signaling the presence of targeted pre-selected insects as recited in claim 11, wherein said characteristic biometric signal information uniquely identifying said targeted insect species is a characteristic acoustic signal, and said biometric characteristic is an acoustic signal.

13. The automated method for remotely monitoring the prevalence of targeted insects by directly detecting and signaling the presence of targeted pit-selected insects as recited in claim 11, wherein said lure for attracting the targeted insect species is chosen from the group that includes pheromones, adhesive material inside the trap, nutritional substances, insecticides.

14. The automated method for remotely monitoring the prevalence of targeted insects by directly detecting and signaling the presence of targeted pre-selected insects as recited in claim 11, further comprising the steps of detecting a sensed signal using a coarse signal detector, transforming said sensed signal from an analog form to a digital form and further transforming said digital form of said sensed signal from a time-domain spectrum to a frequency-domain spectrum, obtaining a signal correlation by performing a cross-correlation of said frequency-domain spectrum of said sensed signal with said pre-stored value of said characteristic biometric signal information, comparing said signal correlation with a putative identification threshold, and transmitting a positive alert signal to said central monitoring station responsive to said step of comparing said signal correlation with a putative identification threshold.

15. The automated method for remotely monitoring the prevalence of targeted insects by directly detecting and signaling the presence of targeted pre-selected insects as recited in claim 11, further comprising the step of periodically polling said remote direct sensing station from said central monitoring station for checking the operational integrity thereof.

16. The automated method for remotely monitoring the prevalence of targeted insects as recited in claim 11, wherein said positive alert signal includes a unique remote detection station identifier.

17. The automated method for remotely monitoring the prevalence of targeted insects as recited in claim 11, where said step of automatically detecting and discriminating further includes a step of executing a sequence of processing steps stored in a computer readable medium.

* * * * *